Figure 1:
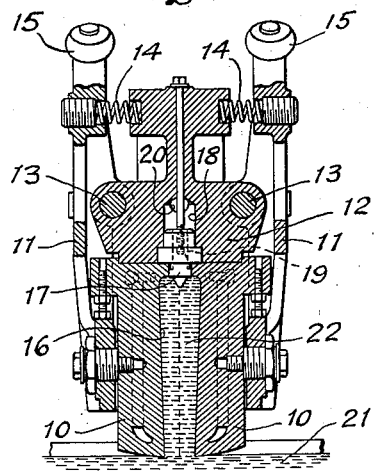

April 30, 1940.  K. E. PEILER  2,199,140
SUCTION CUP FEEDER AND METHOD OF FEEDING Filed June 5, 1937

Witness:
A. A. Horn

Inventor:
Karl E. Peiler
by Brown & Parham
Attorneys.

Patented Apr. 30, 1940

2,199,140

UNITED STATES PATENT OFFICE 2,199,140

SUCTION CUP FEEDER AND METHOD OF FEEDING

Karl E. Peiler, West Hartford, Conn., assignor to Hartford-Empire Company, Hartford, Conn., a corporation of Delaware Application June 5, 1937, Serial No. 146,543

7 Claims. (Cl. 49—5)

In obtaining charges of molten glass by the use of a suction cup, such cup is brought periodically to a glass gathering position at the surface of a supply body of molten glass, is filled with glass from the supply body as a result of the creation of subatmospheric pressure in the cavity of the cup, is raised to permit severance from the supply body of the glass thus gathered, and then is moved to a charge feeding or delivering position laterally of the supply body.

While the inner surface of a suction cup may appear to be smooth, such surface in fact comprises numerous minute raised portions or projections and depressions. The filling of the cup in the usual way, substantially as above described, causes the gathered glass to be forced into intimate contact with these raised portions or projections and depressions, thus tending to enhance the transfer of heat from the gathered glass to the walls of the cup.

It heretofore has been customary to maintain this intimate contact of the gathered glass with the walls of the cup during the travel of the cup from its glass gathering position to the glass charge feeding or delivery position laterally of the supply body of glass. Since this travel necessarily consumes an appreciable period of time, during which heat is being transferred from the glass to the walls of the cup, an undesirably cool and thick skin or enamel may have been formed on the charge by the time the charge is released from the cup for feeding or delivery to a waiting mold or charge receiver. Such a charge may then not be in the best condition for subsequent molding or fabrication into the article of glassware that is being made.

Moreover, the relatively great heat loss from the glass to the walls of the cup necessitates an undesirably high lower limit of the range of temperatures at which the glass of the supply body may be supplied in charges suitable for the production of satisfactory articles of glassware.

I have discovered that if the intimate contact between the gathered glass and the walls of the cup is broken or discontinued as soon as possible after the charging of the cup and before it reaches its charge feeding or delivery position, and air is thus admitted between such glass and the walls of the cup, the loss of heat from the glass to the cup will be appreciably lessened and the charge fed or delivered by the cup to the waiting mold or receiver will be in a better condition for molding or fabrication into an article of glassware, and this even though an apparently close contact is again established between the charge and the cup walls after the initial intimate contact has been broken.

I also have discovered that by breaking or discontinuing the intimate contact between the gathered glass and the walls of the cup, as above described, the range of temperatures of the glass of the supply body suitable for the gathering and production of satisfactory charges may be increased by a lowering of the lower limit of such range. Cooler glass thus may be supplied by the supply body when desired for the gathering and production of charges suitable for manufacture into certain glass articles, such as relatively large articles.

Objects of the present invention are to provide suitable apparatus and a practical method for carrying the above described discoveries into effect.

One such apparatus and the method performed by the use thereof will now be described, reference being made to the accompanying drawing, in which fragmentary vertical sectional views, Figures 1 to 5, inclusive, illustrate different steps of the method and show such parts of apparatus for carrying out the invention as require illustration for an understanding of the invention.

A suction cup shown in the drawing comprises sections 10, preferably water-cooled, carried by substantially vertical levers 11 and cooperative with a suction head 12 to which intermediate portions of the levers 11 are pivoted, as at 13. Compression springs 14 between the upper arms of the levers and the adjacent portion of the suction head tend to maintain the sections 10 of the cup closed and against the lower surface of the suction head, as shown in Fig. 1. Rollers 15 on the upper ends of the levers may be engaged by cams, as hereinafter described, to effect opening movements of the sections 10 against the action of the springs 14.

The cup sections 10, when closed, define a cavity 16 which may decrease in cross-section or taper slightly from its upper to its lower end. A pin 17 depends from the suction head into the upper part of the cup cavity centrally of the latter. A chamber or space 18 in the suction head communicates through a suitable passage or passages, such as that indicated at 19 in Fig. 1, with the upper part of the cup cavity. The chamber or space 18 may be connected with suitable pneumatic supply means (not shown), as at the opening indicated at 20, so constructed and arranged that a desirable partial vacuum may be created in the space 18 and hence in the cup cavity at the proper time in a cycle of operations of the cup for the performance of the method of the present invention. Of course, such pneumatic supply means should include suitable valves or control mechanism for discontinuing the partial vacuum or subatmospheric pressure at the proper time and such supply means may also be of such construction as to permit atmospheric pressure and/or super-atmospheric pressure to be applied to the space 18 and its communicating passages at suitable times or a suitable time during cessation of the subatmospheric pressure. No particular pneumatic supply means has been shown as such means can be readily supplied by those skilled in the art.

Suitable means (also not shown) may be provided for supporting the suction head 12 and the parts carried thereby and for moving them as required to carry out the method of the present invention. As suitable means for this purpose are well known in the art, illustration thereof in the accompanying drawing has been deemed unnecessary.

In carrying out the objects of the present invention by the use of the mechanism shown in the drawing, the suction cup, in closed condition, is brought in any suitable way and by the use of any suitable supporting and operating means to a glass gathering position at the surface of a supply body 21 of molten glass. A sub-atmospheric pressure is created in the cavity of the closed cup so that such cavity will be filled from the supply body with a charge of glass, as indicated at 22 in Fig. 1.

Figure 2:
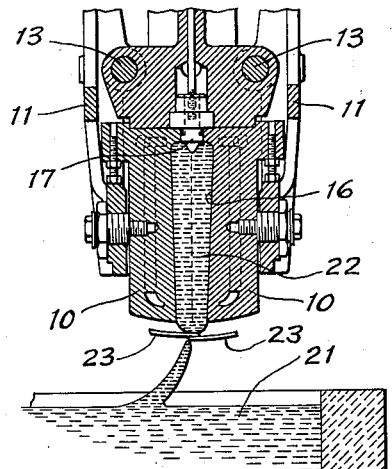

The movement of the charged cup from its gathering position is then commenced and as soon as such cup has been raised a sufficient distance from the supply body of molten glass, the gathered charge in the cup is severed from the glass of the supply body by a suitable severing mechanism, represented by the closed shear blades 23—23 in Fig. 2.

Figure 3:
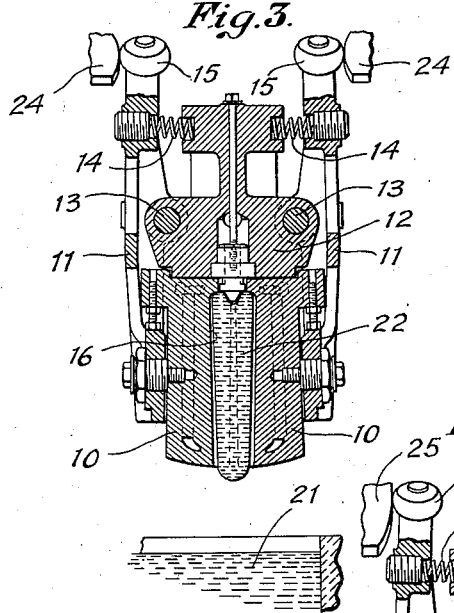
Figure 4:
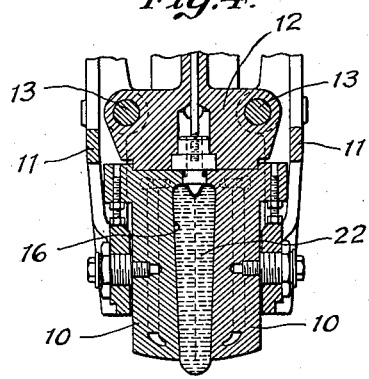

The operations described so far are in accordance with the usual practice. A marked departure therefrom, according to the present invention, consists in cracking open the sections of the cup to a slight extent at an early stage of outward movement of the charged cup, as immediately after the completion of the severing operation. As shown in Fig. 3, this slight opening movement of the sections of the cup has been effected by causing the rollers 15 on the levers 11 to pass between suitably spaced stationary cams 24 as the outward movement of the cup is continued after the severing operation. These cams may engage the rollers 15 only very briefly and of course the time during which the sections of the cup are slightly open will then be correspondingly brief as the cup sections will again be closed, as shown in Fig. 4, as soon as the rollers 15 leave the cams.

It has been found in actual practice that this slight opening of the cup sections, however brief the period thereof may be, is attended by important results. The intimate contact of the glass of the charge with the projections and depressions at the surface of the walls of the cup cavity will be broken and air will be admitted between the glass charge and such walls. The subatmospheric pressure on the glass charge may have been discontinued prior to the slight opening of the cup sections and air under slight positive pressure might be applied, if desired, during such slight opening of the cup sections and the breaking of the intimate contact between the charge and the walls of the cup cavity.

The slight opening of the cup sections will permit a downward movement of the charge although such a movement is not essential to the attainment of the objects of the present invention. When the particular cup shown in the drawing is employed, a slight downward movement of the charge will occur, both by reason of the force of gravity and because the particular cup sections and the means by which they are mounted are constructed and arranged to impart a downward axial movement to the charge as the sections of the cup open. The pin 17 serves to form a central depression in the top of the charge and also to center or steady the charge as the opening movements of the cup sections are initiated so that the upper portion of the charge will not cling to either section as the other moves away from it. Pins or top closures for the top of the cup cavity of other and different forms and constructions may be employed.

When the sections of the cup close after the brief period during which such sections were slightly open, the downward movement of the charge will be halted, if it has not already been halted, by the contact of such charge with the tapering walls of the cup cavity. While this second contact of the charge with the walls of the cup cavity may appear to be close, as shown in Fig. 4, for example, it has been found in actual practice that there is a substantial reduction in the transfer of heat from the glass to the walls of the cup, even though the sections of the cup be closed very quickly. The reduction of heat loss is believed to be due, at least in part, to the less intimate contact of the glass with the cup walls, a thin film of air probably being interposed therebetween or at least between the glass and the minute depressions in the surface of the walls of the cup cavity.

Also, the fact that the charge already has a skin or enamel thereon probably aids in preventing reestablishment or resumption of the same degree or intimacy of contact between the glass and the walls of the cup cavity as existed prior to the cracking open of the cup sections. This skin or enamel also serves to confine the more fluid glass of the charge so that the cup sections may be closed without pinching glass of the charge between such sections, even though the cavity of the cup when the sections are closed is downwardly tapering, as shown or to an even greater degree.

Figure 5:
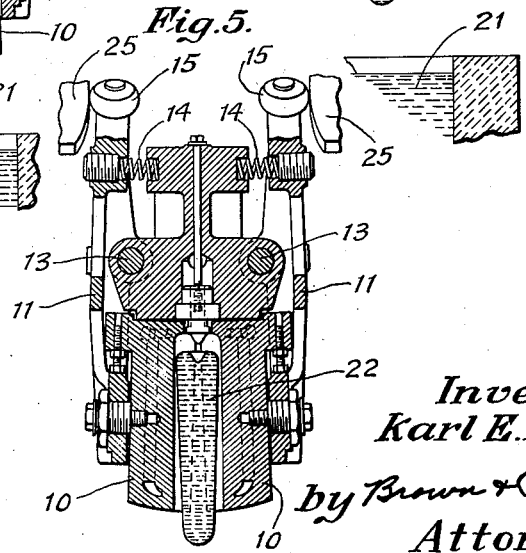

The further movement of the charged cup from the position shown in Fig. 4 will bring the rollers 15 between a second pair of spaced stationary cams 25 which will actuate the levers 11 so as to open the cup sections 10 to release the charge 22 at the time the cup reaches its charge feeding or delivery position, as shown in Fig. 5. The charge may drop axially downward to a waiting mold or charge receiver (not shown).

The suction cup and associate mechanism, as shown in the drawing and herein described, do not form part of the present invention when considered as to structural details and independently of the cams 24 for effecting the initial slight opening of the cup sections. Instead, they are included in the invention of Robert W. Canfield, as disclosed and claimed in his application, Serial No. 100,408, filed September 12, 1936, owned by the owner of the present application. This particular structure has been shown because it has been actually used successfully in the gathering and delivery of charges according to the present invention. Such charges were manufactured into articles of glassware of high grade and quality.

It is, however, within the purview of the present invention to use apparatus other than that shown. The invention therefore is not to be limited by the description herein of specific mechanism or the showing of such mechanism in the accompanying drawing, but instead extends to all structures and methods which fairly fall within the scope of the appended claims.

The term "cup" as used herein is to be construed as referring to any open-bottomed receptacle that is employed in the gathering of glass from the surface of a supply body or pool and the term "charge" is to be construed as covering the glass thus gathered and which at the time of its delivery from the receptacle requires some further fabrication or shaping to produce an article having the final shape desired, irrespective of the extent or character of such further fabrication or shaping.

I claim:

1. The method of obtaining a charge of glass suitable for further fabrication to produce an article of glassware, comprising the steps of bringing a sectional gathering cup to a glass gathering position at the surface of a supply body of molten glass, causing glass of the supply body to fill the cavity of the gathering cup and to contact intimately with the walls of the cup cavity, moving the charged cup from the glass gathering position toward a charge delivery position laterally of the supply body, severing the charge in the cup from the glass of the supply body, and after the filling of the cup and before it reaches its charge delivery position, opening the sections of the cup slightly to break the intimate contact of the glass of the charge with the walls of the cavity.

2. The method of obtaining a charge of glass suitable for further fabrication to produce an article of glassware, comprising the steps of bringing a sectional gathering cup to a glass gathering position at the surface of a supply body of molten glass, causing glass of the supply body to fill the cavity of the gathering cup and to contact intimately with the walls of the cup cavity, moving the charged cup from the glass gathering position toward a charge delivery position laterally of the supply body, severing the charge in the cup from the glass of the supply body, opening the sections of the cup slightly to break the intimate contact of the glass of the charge with the walls of the cavity soon after the filling of the cup and before said cup and the charge reach said delivery position, and discharging the charge from said cup at said delivery position.

3. The method of obtaining a charge of glass suitable for further fabrication to produce an article of glassware, comprising the steps of causing a sectional suction cup at a glass gathering position at the surface of a supply body of molten glass to be filled with glass from said supply body, initiating movement of the filled cup from the gathering position toward a charge delivery position laterally of the supply body, severing the glass in the cup from the supply, and after the filling of said cup and before it reaches said charge delivery position, opening slightly the sections of the cup to break the intimate contact of the glass therein with the walls of the cavity of the cup and then closing said sections about said glass.

4. The method of obtaining a charge of glass suitable for further fabrication to produce an article of glassware, comprising the steps of causing a sectional suction cup at a glass gathering position at the surface of a supply body of molten glass to be filled with glass from said supply body, initiating movement of the filled cup from the gathering position toward a charge delivery position laterally of the supply body, severing the glass in the cup from the supply, and opening slightly the sections of the cup immediately after the severing operation to break the intimate contact of the glass and the walls of the cavity of the cup during the movement of the cup and the glass therein toward said charge delivery position.

5. The method of obtaining a charge of glass suitable for fabrication into an article of glassware, comprising bringing a sectional suction cup having a downwardly tapering cavity to a glass gathering position at the surface of a supply body of molten glass, causing said cup to be filled with molten glass from said supply body, initiating movement of the filled cup from said gathering position toward a charge delivery position laterally of the supply body, severing the glass in the cup from the supply body, opening the sections of the cup slightly during the movement of the cup toward the delivery position to break the initial intimate contact of the glass therein with the walls of the cup cavity, and opening said sections wider at the delivery position to discharge such glass from the cup.

6. Glass feeding apparatus comprising an open-bottomed sectional suction cup movable from a glass gathering position at the surface of a supply body of molten glass to a delivery position laterally of said supply body, means located between said gathering position and said delivery position for opening slightly the sections of said cup after the cup has left its glass gathering position and before it has reached its delivery position, and other means located adjacent to the delivery position for opening the sections of the cup to release the gathered glass from the cup at the delivery position.

7. Glass feeding apparatus comprising a sectional suction cup having a downwardly tapering open-bottomed glass gathering cavity therein when the sections are closed, said cup being movable from a glass gathering position at the surface of a supply body of molten glass to a delivery position laterally of the supply body, means for slightly opening the sections of the cup during the movement of the cup from the gathering position to the delivery position, and other means for opening the sections of the cup more widely at the delivery position.

KARL E. PEILER.